Figure 1:
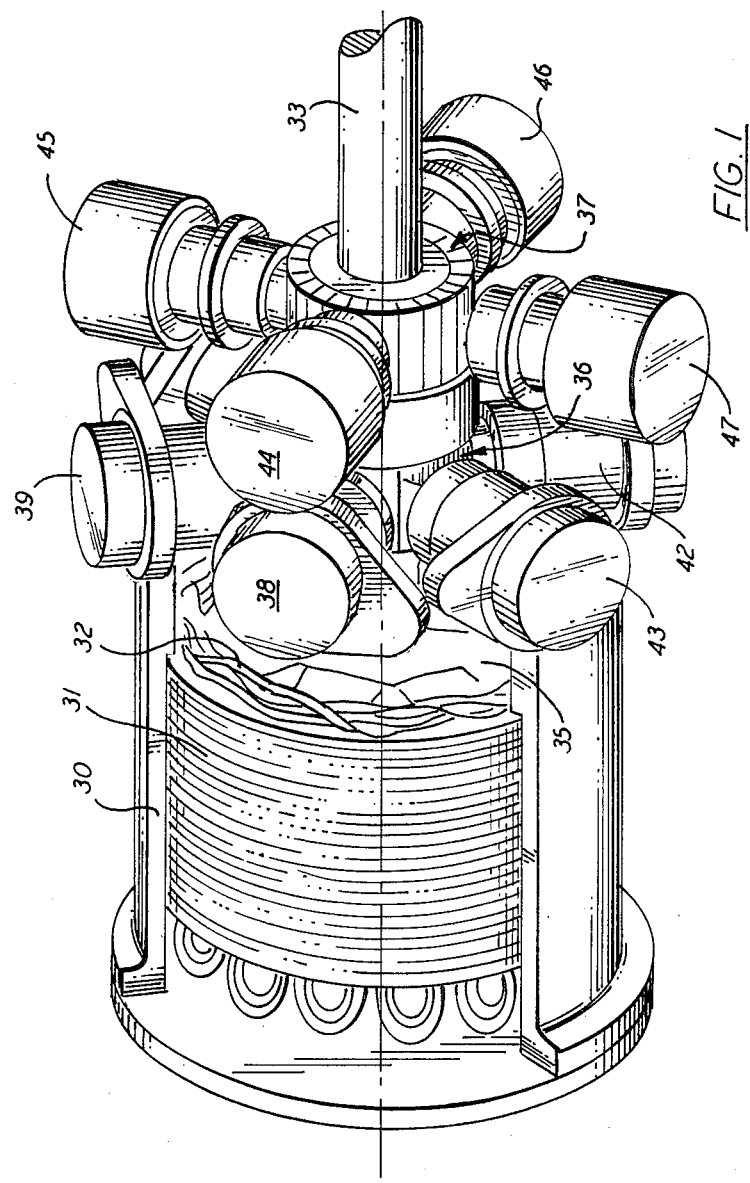

United States Patent [19]

Masterman

[11] Patent Number: 4,704,552
[45] Date of Patent: Nov. 3, 1987

[54] ELECTRICAL MACHINE

[75] Inventor: John M. Masterman, Cheltenham, England

[73] Assignee: Dowty Fuel Systems Limited, Cheltenham, England

[21] Appl. No.: 762,569

[22] Filed: Aug. 5, 1985

[30] Foreign Application Priority Data

Aug. 17, 1984 [GB] United Kingdom ............... 8421035

[51] Int. Cl.⁴ ............................................. H02K 13/00
[52] U.S. Cl. ....................................... 310/148; 290/46
[58] Field of Search ............................... 310/128–140, 310/240, 113, 148–151; 290/46, 49, 31, 52, 47

[56] References Cited

U.S. PATENT DOCUMENTS

| | | | |
|---|---|---|---|
| 2,747,116 | 5/1956 | Poole | 310/128 |
| 3,173,043 | 3/1965 | Newill | 310/128 |
| 3,436,573 | 4/1969 | Persson | 310/140 X |
| 3,555,322 | 1/1971 | Apsit | 310/113 |
| 3,577,002 | 5/1971 | Hall et al. | 290/46 |
| 3,590,262 | 6/1971 | Sheffield et al. | 290/46 |
| 3,904,883 | 9/1975 | Horwinski | 290/49 X |
| 4,219,739 | 8/1980 | Greenwell | 310/113 X |
| 4,347,453 | 8/1982 | Gaus | |
| 4,516,047 | 5/1985 | Duverger | 310/240 |

FOREIGN PATENT DOCUMENTS 1523467 8/1978 United Kingdom .
2078451 1/1982 United Kingdom .

Primary Examiner—Donovan F. Duggan
Attorney, Agent, or Firm—Hayes, Davis & Soloway

[57] ABSTRACT

An electrical machine comprising a stator having electrical windings and a permanent-magnet rotor which carries a shaft arranged for connection to a prime mover. The machine, when the shaft is driven by a prime mover, acts as an alternator to produce alternating electrical current. A commutator is provided on the shaft and electrical-current-transferring brushes are associated with the commutator. Means is electrically associated with the segments of the commutator and with the electrical windings on the stator so that, whe the brushes are connected to a source of direct electrical current, the machine acts as a motor and the shaft is caused to rotate for starting a prime mover connected to the shaft.

2 Claims, 7 Drawing Figures

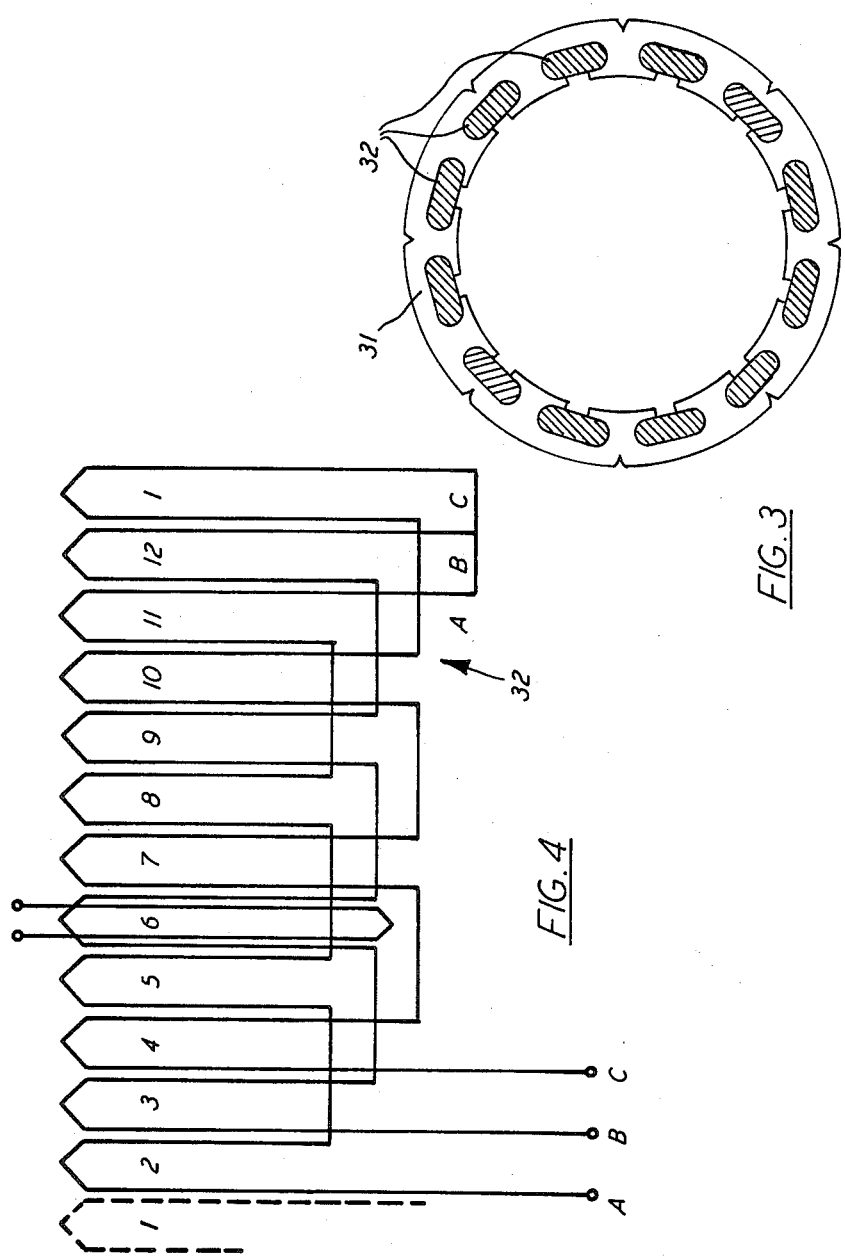

ELECTRICAL MACHINE

This invention relates to electrical machines; in particular it relates to those electrical machines known as alternators which produce an alternating electrical current output.

An alternator may be driven by a prime mover, and before an alternating current can be produced, it is necessary to start the operation of the prime mover.

According to this invention an electrical machine comprises
(i) a stator,
(ii) electrical windings on the stator,
(iii) a permanent magnet rotor,
(iv) a shaft carried by the rotor and arranged for connection to a prime mover; the machine, when the shaft is driven by a prime mover, acting as an alternator to produce an alternating electrical current,
(v) a first commutator on the shaft,
(vi) electrical-current-transferring brushes associated with the first commutator, and
(vii) means electrically associated with the segments of the commutator and with the electrical windings on the stator so that, when the brushes are connected to a source of direct electrical current, the machine acts as a motor and the shaft is caused to rotate for starting a prime mover connected to the shaft.

The said means includes
(i) a further commutator on the shaft whose segments are appropriately electrically connected to the segments of the first-mentioned commutator, and
(ii) further electrical-current-transferring brushes associated with the further commutator and electrically connected to the electrical windings on the stator.

The embodiment example, will now be described with reference to the accompanying drawings.

Figure 2:
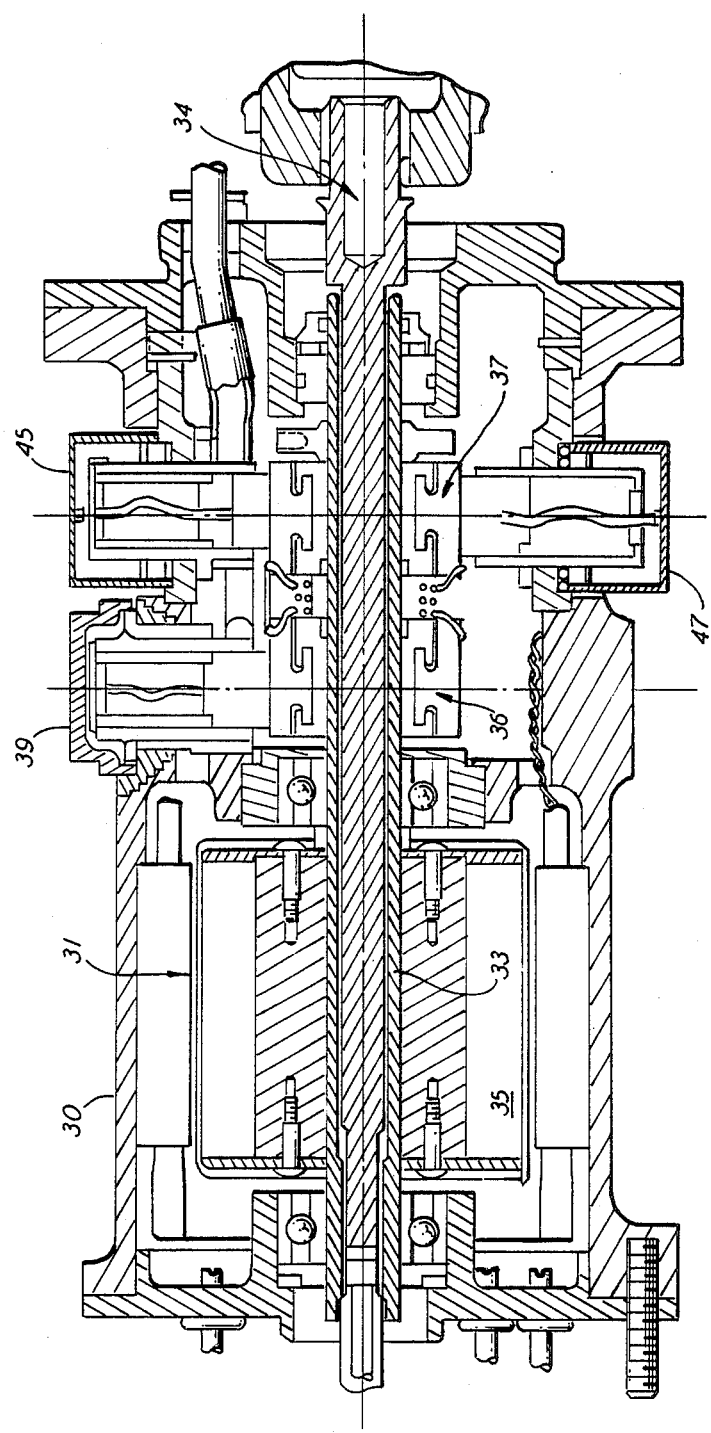
Figure 5:
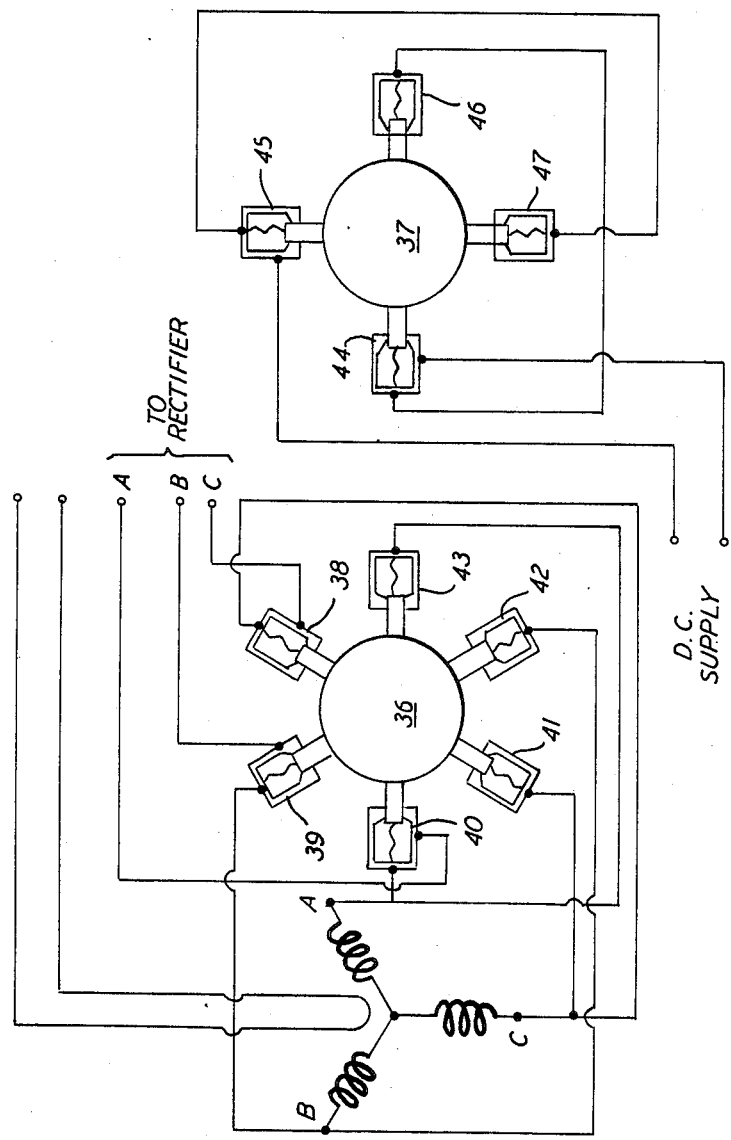
Figure 6:
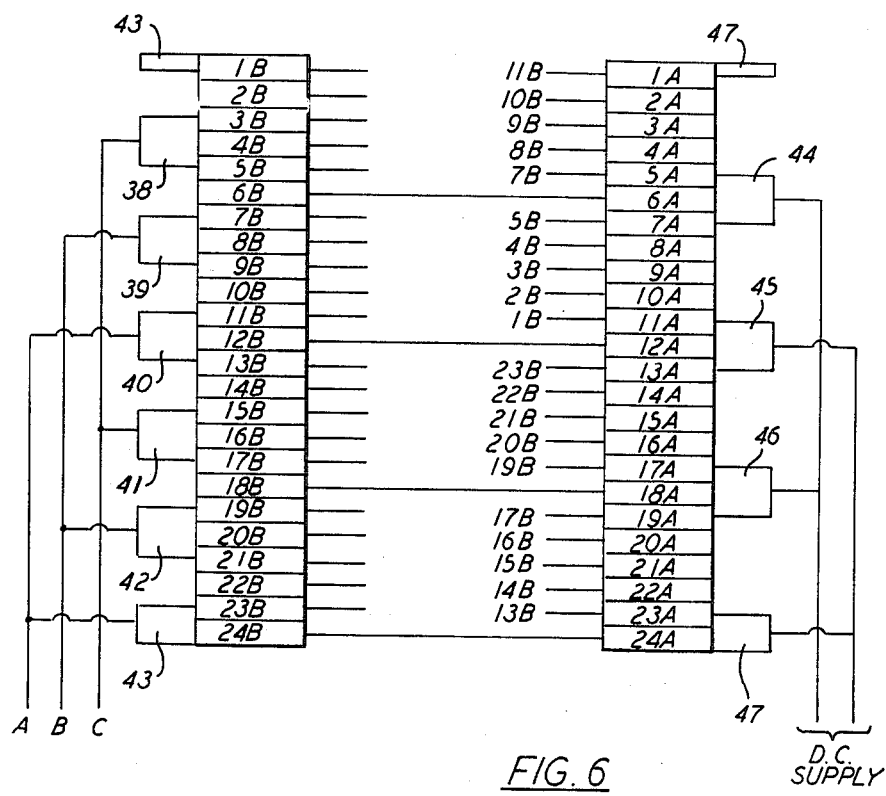
Figure 7:
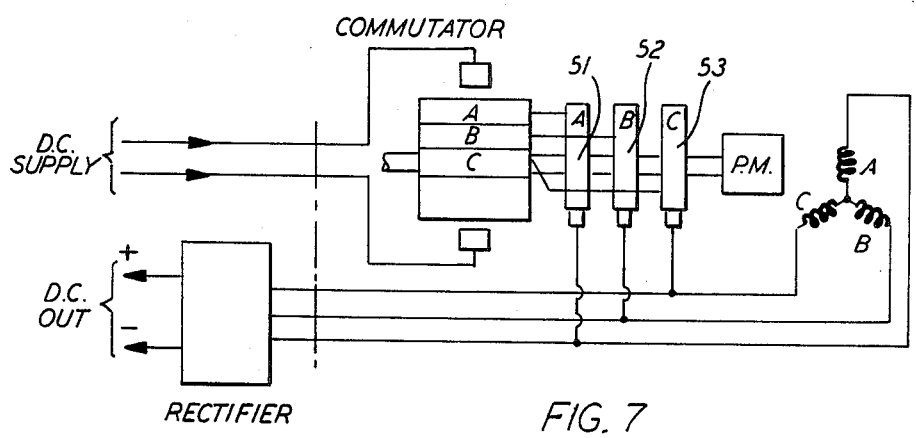

FIG. 1 of the drawings is a perspective view of an electrical machine, with parts removed, in accordance with the first embodiment, FIG. 2 is a sectional view of the machine, FIG. 3 is a cross-sectional view of the stator of the machine with its three-phase winding, FIG. 4 is a stator wiring diagram, FIG. 5 is a circuit diagram of the machine, and FIG. 6 is a developed view of the two commutators of the machine showing their electrical interconnections, the one with the other.

Referring to FIGS. 1 to 6 of the drawings, the machine housing 30, a stator 31 having twelve equally-spaced pole-pieces, and a three-phase star-connected stator winding 32.

A shaft 33 is mounted for rotation in the housing and at one end 34 it is arranged for connection to, say, an engine ( not shown) which will cause rotation of the shaft when the electrical machine is to act as an alternator.

A multipole permanent-magnet rotor 35 is disposed within the stator 31 and is fixed to the shaft 33 for rotation therewith.

The shaft 33 carries, also for rotation therewith, a first commutating device 36 and a second commutating device 37. The two commutating devices are spaced apart the one from the other.

The first commutating device 36 has associated with it six electrical-current-transferring brushes 38, 39, 40, 41, 42 and 43 (not all of them are visible in FIGS. 1 and 2). It also has twenty-four commutator segments 1B, 2B ... 24B, (see FIG. 6).

The second commutating device 37 has associated with it four electrical-current-transferring brushes 44, 45, 46 and 47 (not all of them are visible in FIG. 2). It also has twenty-four commutator segments 1A, 2A ... 24A (see FIG. 6).

The three-phase star-connected stator winding (which is shown in FIG. 4) is connected to an output circuit directly by way of the brushes of the first commutating device.

When the shaft 33 is driven by, say, an engine, the permanent-magnet rotor 35 rotates with respect to the three-phase stator winding 32. A three-phase current, having phases A, B and C, is thus induced in the stator windings and the machine acts as an alternator. As shown in FIGS. 5 and 6, phase A is directly connected to the output circuit by way of the terminals of the electrical-current-transferring brushes 40 and 43; phase B is directly connected to the output circuit by way of the terminals of the electrical-current-transferring brushes 39 and 42; phase C is directly connected to the output circuit by way of the terminals of the electrical-current-transferring brushes 38 and 41.

The three-phase current thus generated in the output circuit by the machine may be fed to a rectifier where the AC current output is rectified to a DC current, if that is required.

The purpose of the two commutating devices is to permit the machine to function as a direct current motor to start up the engine so that the electrical machine thereafter can function as an alternator.

The segments 1A, 2A ... 24A of the second commutating device are cross connected to the segments 1B, 2B ... 24B in the manner shown in FIG. 6. One pole of a direct current supply can be connected to the electrical-current-transferring brushes 44 and 46 and the other pole of the direct current supply can be connected to the electrical-current-transferring brushes 45 and 47.

If, when the engine of the shaft 33 is not running and it is necessary to start it, so that the electrical machine can thereafter act as an alternator, direct current will be supplied to electrical-current-transferring brushes 44, 45, 46 and 47. This direct current will be so passed, by way of the first commutator device 36, to the stator winding. The electrical currents therein will cause the multipole permanent-magnet-rotor to rotate. This rotation will cause rotation of the prime mover and hence cause it to start.

Where the electrical machine hereinbefore described is intended for use in association with engines having a relatively long operational life and run for long periods of time before shut-down, means are provided to avoid unnecessary brush wear and heat generation at the commutators particularly if high altitude operation is envisaged. Such means may comprise a clutch mechanism which would isolate the permanent-magnet rotor from the commutator or commutators of the rotating assembly when speeds exceed a specified value, less than the minimum engine drive speed in normal operation as an alternator. Alternatively such means may comprise other suitable devices, for example solenoid-operated devices or centrifugally-operated devices with required hysteresis, which are intended to lift the brushes away from engagement with the commutator or commutators when speeds exceed a specified value, less than the minimum engine drive speed in normal operation as an alternator.

What is claimed is:

1. An electrical machine comprising:
   (i) a stator,
   (ii) electrical windings on the stator;
   (iii) a permanent-magnet rotor;
   (iv) a shaft carried by the rotor and arranged for connection to a prime mover, the machine, when the shaft is driven by a prime mover, acting as an alternator to produce an alternating electrical current;
   (v) a first commutator on the shaft;
   (vi) electrical-current-transferring brushes associated with the first commutator;
   (vii) second commutator on the shaft, and
   (viii) electrical-current-transferring brushes associated with the second commutator, the first and second commutators being connected together so that when the brushes of the second commutator are connected to a source of direct electrical current the machine acts as a motor and the shaft is caused to rotate for starting the prime mover connected to the shaft.

2. An electrical machine as claimed in claim 1, wherein segments of the first commutator are cross-connected with segments of the second commutator.

* * * * *